United States Patent [19]

Tucker et al.

[11] Patent Number: 5,808,911
[45] Date of Patent: Sep. 15, 1998

[54] SYSTEM AND METHOD FOR REMOTE OBJECT RESOURCE MANAGEMENT

[75] Inventors: Andrew G Tucker, Los Altos; Madhusudhan Talluri, Fremont; Declan Murphy, San Francisco; Yousef A. Khalidi, Sunnyvale, all of Calif.

[73] Assignee: Sun Microsystems, Inc., Mountain View, Calif.

[21] Appl. No.: 879,151

[22] Filed: Jun. 19, 1997

[51] Int. Cl.[6] ............................................. G01B 7/00
[52] U.S. Cl. ..................... 364/559; 395/683; 395/185.1
[58] Field of Search ............................. 364/559; 395/683, 395/674, 183.01–183.07, 185.1

[56] References Cited

U.S. PATENT DOCUMENTS 5,724,503  3/1998  Kleinmman ........................ 395/185.1

OTHER PUBLICATIONS

Microsoft "Microsoft Windows NT Server Cluster Strategy: High Availability and Scalability With Industry–Standard Hardware" (Microsoft, Business Systems Division White Paper) Unknown Date.

Bernabeu–Auben, J.M et al, "Extending a traditional OS using object–oriented techniques"; Proceedings of the second USENIX Conference on Object–Oriented Technologies and Systems; pp. 53–63 of 261 pp., Jun. 1996.

Khalidi, Y. A.; "Solaris MC: a multi computer OS"; Proceedings of the USENIX 1996 Annual Technical Conference; pp. 191–203 of 352 pp., Jan. 1996.

*Primary Examiner*—James P. Trammell
*Assistant Examiner*—Kamini S. Shah
*Attorney, Agent, or Firm*—Gary S. Williams; Flehr Hohbach Test Albritton & Herbert

[57] ABSTRACT

The present invention pertains to a system and method for tracking object references in an object-oriented computing system including a number of independent computing nodes interconnected by a communications link. The reference counting mechanism tracks references to an object at three levels. At a first level, the server handler associated with an object is used to track local references to the object by other user applications within the same domain. At a second level, the inter-process communications facility (i.e., door facility) is used to track object references that are exported to different domains within the same node. At a third level, the kernel object request broker (ORB) is used to track object references that are exported outside the node. When all external object references are released, the ORB notifies the object's server handler of this occurrence. Similarly, the door facility notifies the object's server handler when all inter-domain references have been released. The object's server handler will initiate the appropriate reclamation procedures when it receives notification from the ORB and the door facility and when its own local references have been relinquished.

21 Claims, 11 Drawing Sheets

SYSTEM AND METHOD FOR REMOTE OBJECT RESOURCE MANAGEMENT

The present invention relates generally to object-oriented operating systems and particularly to a system and method for facilitating the deletion of objects.

BACKGROUND OF THE INVENTION

A current trend in the computer industry is the interconnection of a number of independent computing nodes connected by a high-speed communications link. Each computing node is associated with one or more domains, where each domain represents a process having its own address space. Each domain contains a number of objects that can be invoked by other domains either in the same node as the referenced object or in different nodes connected to the node containing the referenced object.

Routinely, an object manager safely destroys object references that are no longer used and reclaims their resources. However, the object manager needs to know when there are no longer any outstanding references to the object in order to safely reclaim the associated resources. In a computing system having multiple independent computing nodes, there needs to be a mechanism for accurately tracking object references from all domains, local or remote.

SUMMARY OF THE INVENTION

The system and method of the present invention pertains to an improved reference counting methodology for use in an object oriented computer system including a number of independent computing nodes interconnected by a communications link.

The node represents client and/or server computers that do not share memory. Each node includes one or more domains, each of which represent a separate address space. Associated with each domain are objects that can be invoked by any application within the domain that has acquired permitted access to an object. Thus, an application can access objects that are within the same domain, that reside in a different domain within the same node, or in a different domain in a different node. The location of the object (i.e., the object's method) is transparent to the user.

The reference counting mechanism tracks references to an object at three levels. At a first level, the server handler associated with an object is used to track local references to the object by other user applications within the same domain. At a second level, the inter-process communications facility (i.e., door facility) is used to track object references that are exported to different domains within the same node. At a third level, the kernel object request broker (ORB) is used to track object references that are exported outside the node.

When all external object references are released, the ORB notifies the object's server handler of this occurrence. Similarly, the door facility notifies the object's server handler when all inter-domain references have been released. The object's server handler will initiate the appropriate reclamation procedures when it receives notification from the ORB and the door facility and when its own local references have been relinquished.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Overview

The reference counting mechanism of the present invention utilizes the inter-process communications facility and object request broker (ORB) facility of the operating system associated with the distributed computing system. The inter-process communications facility (i.e., door mechanism) is used to export object references between domains within the same node and the ORB is used to export object references between nodes. For this reason, this document will first describe the inter-process communications facility and the ORB before describing the reference counting mechanism.

Figure 1:
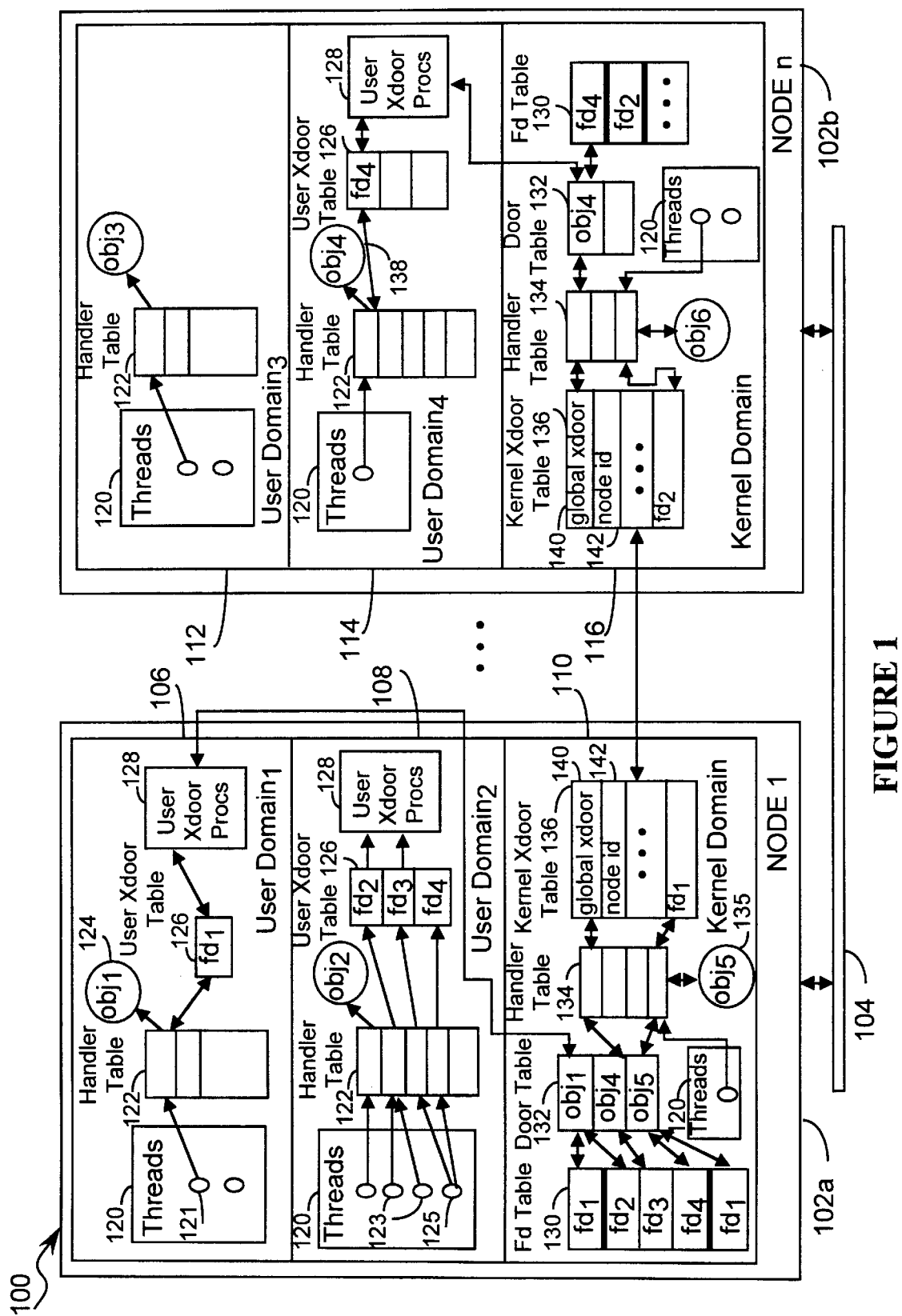
FIG. 1 is a block diagram of a computer system incorporating the preferred embodiments of the present invention.

Referring to FIG. 1, there is shown a distributed computer system 100 including a plurality of computing nodes 102. Each computing node 102 represents an independent client/server computer that is interconnected via a communications link 104. Each node can be considered a client and/or a server computer. A client computer is associated with a node that invokes an object. A server computer is associated with a node that stores the object's methods. In certain cases, as will be shown below, the client and server computer will be the same node. In other cases, the client and server computers are distinct nodes.

The communications link 104 generically refers to any type of wire or wireless link between computers, such as but not limited to a local area network, a wide area network, or a combination of networks. The client/server computers use the communications link 104 to communicate with each other.

Each node 102 has one or more domains 106, 108, 110, 112, 114, 116. A domain is defined to be a process with its own address space. A domain can have multiple threads 120 of execution (usually called threads) that can execute user or kernel application procedures. A kernel domain 110, 116 refers to the operating system and a user domain 106, 108, 112, 114 refers to a process other than the operating system. The user domains 106, 108, 112, 114 typically execute one or more user application procedures. Each domain 106, 108, 110, 112, 114, 116 has one or more objects associated with it.

In a preferred embodiment, the operating system or kernel is the Solaris MC operating system, which is a product of Sun Microsystems, Inc. Background information on the Solaris MC operating system can be found in "Solaris MC: A Multi-Computer OS," Technical Report SMLI TR-95-48, November 1995, Sun Microsystems, which is hereby incorporated by reference.

The Solaris MC operating system is a UNIX based operating system. As such, in describing the present technology, UNIX terminology and concepts are frequently used. However, this is for illustration purposes and is not to be construed as limiting the invention to this particular operating system design.

Each thread can request the execution of an object (i.e., object's method). The location of the object is transparent to the thread. The object can reside in one of several locations. It can reside within the same domain as the requesting thread, in a different domain as the requesting thread but within the same node as the requesting thread, or in the domain of a remote node. For example, user domain 106 depicts a thread 121 with access to object 124 that resides within its domain. User domain 108 shows two threads 123 that reference object 124. Threads 123 reside in a different domain 106 from object 124 but are located in the same node 102*a*. Threads 123 reference object 124 through file descriptor $fd_2$ which is mapped into file descriptor $fd_1$ associated with the object in domain 106.

In addition, thread 125 references an object 138 that resides in a domain 114 in remote node 102*b*. Object 138 is represented in referencing domain 108 as file descriptor $fd_3$ which is mapped into a system-wide identifier consisting of a global xdoor identifier 140 and node identifier 142. The system-wide identifier is transmitted in a remote object invocation request to the appropriate remote node 102*b*. The remote node 102*b* translates the system-wide object identifier to the appropriate local identifier and executes the method associated with the requested object 138.

Furthermore, thread 125 can reference an object 135 within the kernel domain 110. Object 135 is represented in referencing domain 110 as file descriptor $fd_4$ which is then mapped into $fd_1$ in kernel domain 110.

A kernel domain 110, 116 has multiple threads 120 that can execute kernel applications. Each kernel domain 110, 116 can have one or more kernel objects associated with it. A kernel object can be invoked by a thread within its domain, by a thread in a different domain within the same node, or by a thread in a different domain in another node.

The execution of an object method for an object that is within the domain of the requesting application is treated as a local procedure call. The local procedure call is typically a function or subroutine call that transfers control from the application to the object's method with a return of control to the application. The arguments associated with the object are passed along in the local procedure call.

The execution of an object method for an object that resides in a remote domain is treated as a remote procedure call. The remote procedure call is handled by the ORB. Thus, the ORB is used to invoke the methods of the objects residing in different domains as the application. The remote objects can be situated in the same node or in a different node as the application.

A door is a kernel state entity that describes an object's method and data. It exists only for intra-node remote objects (i.e., an intra-node remote object is an object that resides in a different domain within the same node as the requesting domain). A door is represented by a file descriptor (fd). Each user domain 106, 108, 112, 114 has a user xdoor table 126 that stores the file descriptors of those objects accessible by threads associated with the domain. A user domain references a remote object through a file descriptor, located in the domain's user xdoor table 126, which is mapped into the actual door. The doors do not reside in the address space of the user accessible domains, rather in the kernel domain.

The use of a file descriptor 154 to represent a door provides a secure mechanism to control the objects that a user can invoke. A file descriptor 154 is a protected kernel state and as such cannot be forged by a user. The possession of a file descriptor 154 indicates that an application has permissible access to an object. The domain that generates the object becomes a server for the object and its door. The server exports object references to those applications that it wishes to have access to the object. In this manner, there is a secure mechanism to selectively control the applications that can access the objects within the distributed system 100.

An object can have a number of file descriptors 154 associated with it. These file descriptors 154 can reside in the same domain as the object or in different domains having permitted access to the object. Each client domain that references a remote object has one or more file descriptors representing the object. For example, object 124 is referenced by file descriptor $fd_1$ in domain 106, and by file descriptor $fd_2$ in domain 108. Object 138 is associated with file descriptor $fd_4$ in user domain 114 in node 102*b* and is associated with file descriptor $fd_3$ in user domain 108 in node 102*a*. In essence, the file descriptor is a local identifier for the object within a particular domain.

Objects that are accessible by remote nodes have an xdoor 170 (see FIG. 2) identified by a global xdoor identifier 140 that is used to uniquely identify the object within a particular node. In addition, each node is uniquely represented by a node identifier 142 that uniquely identifies the node within the distributed system 100. The global xdoor identifier 140 is coupled with the node identifier 142 to produce an identifier that uniquely identifies the object within the distributed system 100.

An application refers to an object utilizing a local xdoor identifier or file descriptor. In order to execute a remote object invocation, the ORB needs to reference the object using the server's file descriptor for that object. Thus, the ORB maps the client's object reference (i.e., local xdoor identifier) into the server's local xdoor identifier. This mapping is performed utilizing a number of procedures and data structures that reside in both the user and kernel domains.

The ORB utilizes several mechanisms to perform this mapping. The ORB includes the following procedures: user-level handler procedures, xdoor procedures, and gateway handler procedures. The xdoor procedures reside in both the user and kernel domains. A brief description of these mechanisms is provided below with reference to FIG. 2.

A user-level object is referenced by a handler procedure 122. The handler procedure 122 controls the basic mechanism of object invocation and argument passing. The handler 122 controls how an object invocation is implemented, how object references are transmitted between address spaces, how object references are released, and similar object runtime operations. For local object invocations, the handler procedure 122 executes a local procedure call to the object's method 150.

For remote object invocations, an object is represented in its domain by a user-level xdoor 152. A user-level xdoor 152 consists of a local xdoor identifier 153, a pointer to an appropriate handler 156, a door identifier 158, and other information. In an embodiment of the present invention, the local xdoor identifier 156 is a file descriptor. The door identifier 158 corresponds to a door representing the object and it is stored in the kernel-level door table 132.

A kernel-level xdoor 170 is a kernel state entity that is used to represent an object throughout the distributed system. The kernel-level xdoor 170 includes a global xdoor identifier 140, a node identifier 142, a pointer 144 to the associated handler code, a door identifier 146, and other information. The global xdoor identifier 140 is used to uniquely identify the object within the node and the combination of the global xdoor identifier 140 and the node identifier 142 is used to uniquely identify an object within the distributed system 100. The door identifier 146 is used to identify the corresponding door 162.

The kernel-level xdoor 170 representing a kernel object contains an additional field that includes a local xdoor identifier 147 representing the kernel object in the kernel domain. Typically, the local xdoor identifier 147 is a file descriptor 154.

A kernel-level file descriptor table 130 is used to store each file descriptor 154 existing within a node 102. The file descriptor table 130 is partitioned into segments 155. Each segment represents the file descriptors 154 associated with a particular domain. Each file descriptor entry 154 references a door stored in a kernel-level door table 132. A door 162 includes a door identifier 164, a process location pointer 166, and other information. The process location pointer 166 reflects an entry point to a procedure in the server's address space that is used to perform the invocation. In the case of an intra-node remote object invocation, the process location pointer 166 is used to access the server's xdoor procedures 128. For the case of an inter-node remote object invocation, the process location pointer 166 is used to access a gateway handler 168 associated with the object. The gateway handler 168 is used to facilitate the transport of the remote object invocation request to the corresponding node. The gateway handler 168 translates object invocations utilizing file descriptors 154 to a respective system-wide identifier.

The inter-process communications facility and ORB facility has been described. The discussion now turns to the manner in which object references are tracked utilizing these facilities when an object reference is exported.

Objects whose methods reside within a user domain are considered user objects. Those objects whose methods reside within the kernel domain are considered kernel objects. The reference counting mechanism differs slightly with respect to user objects and kernel objects. As such, the following description is a description of the reference counting mechanism used for user-objects, followed by a description of the reference counting mechanism used for kernel-objects.

User-Object Reference Counting

An user object can be referenced from various domains. It can be referenced from one or more threads within the domain storing the object's method, from a different domain within the same node, or from a different domain in a different node. As such, the reference counting mechanism is distributed throughout the various mechanisms that support the exportation of an object's reference.

Figure 4:
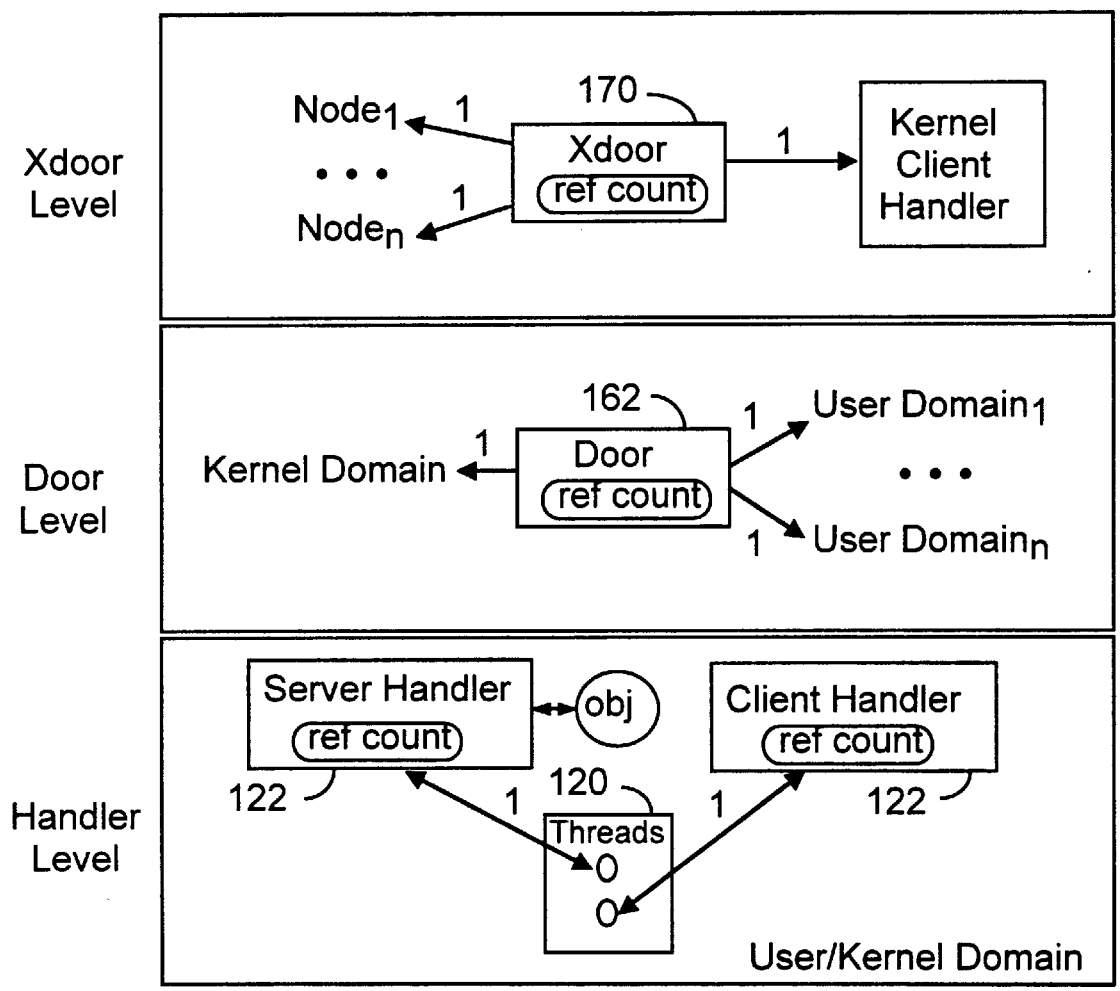
FIG. 4 illustrates the various levels at which object references are tracked.
Figure 5A:
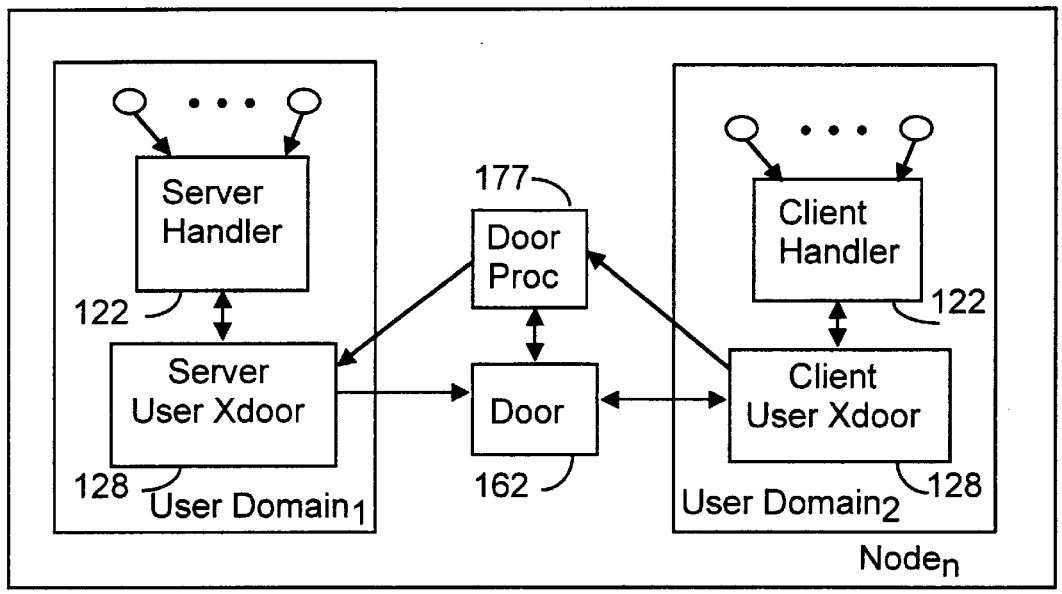
FIGS. 5A–5D are flow charts illustrating the steps used to track an user object.
Figure 5B:
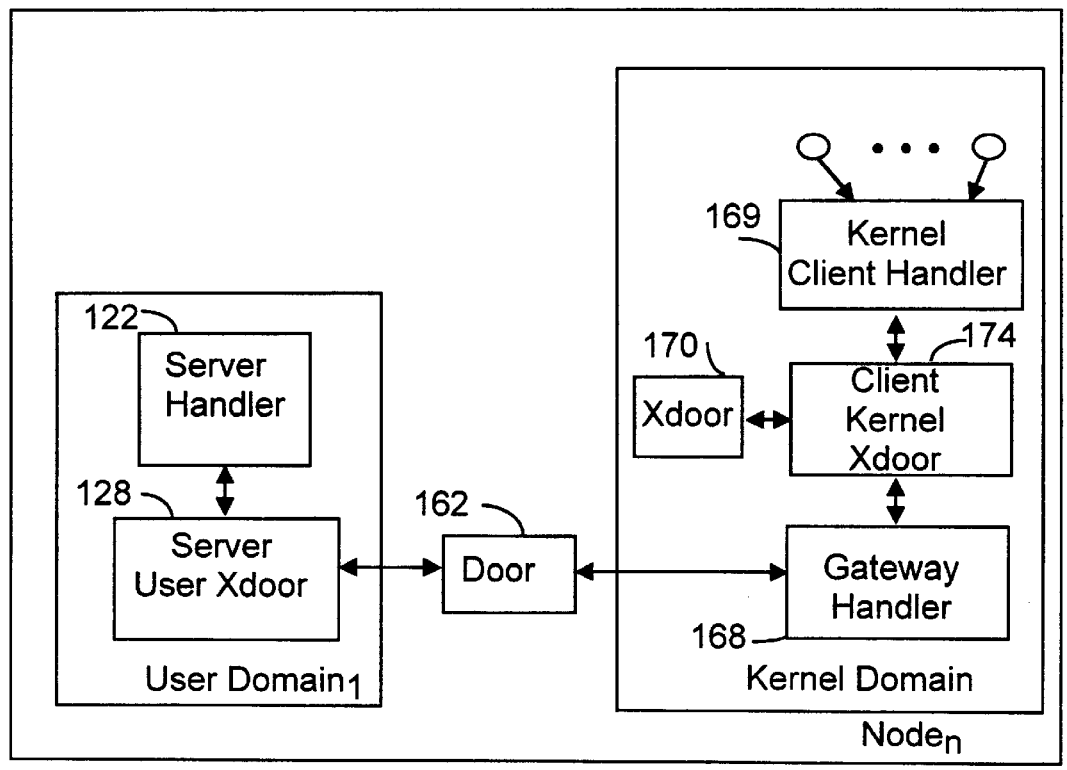
Figure 5C:
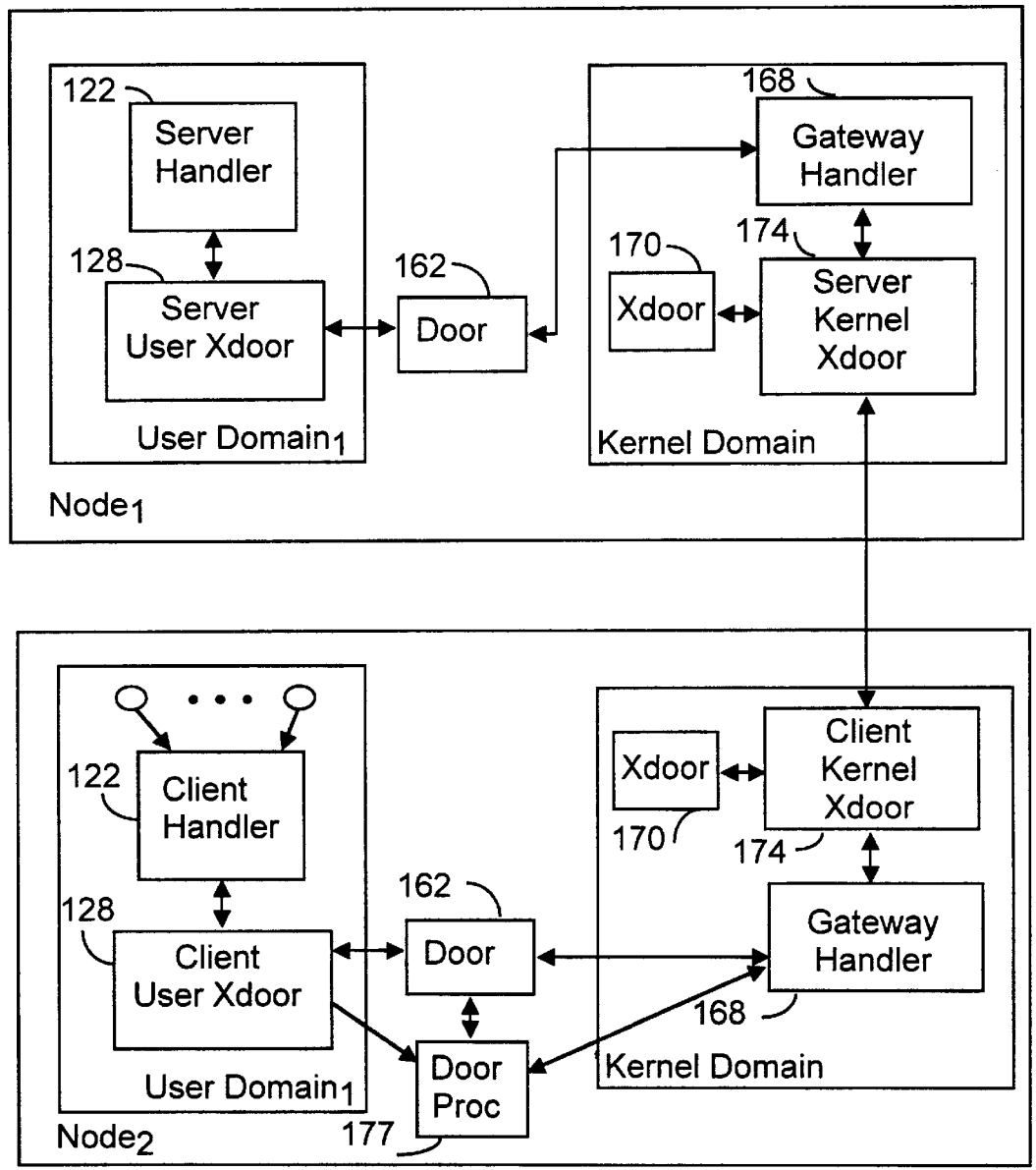
Figure 5D:
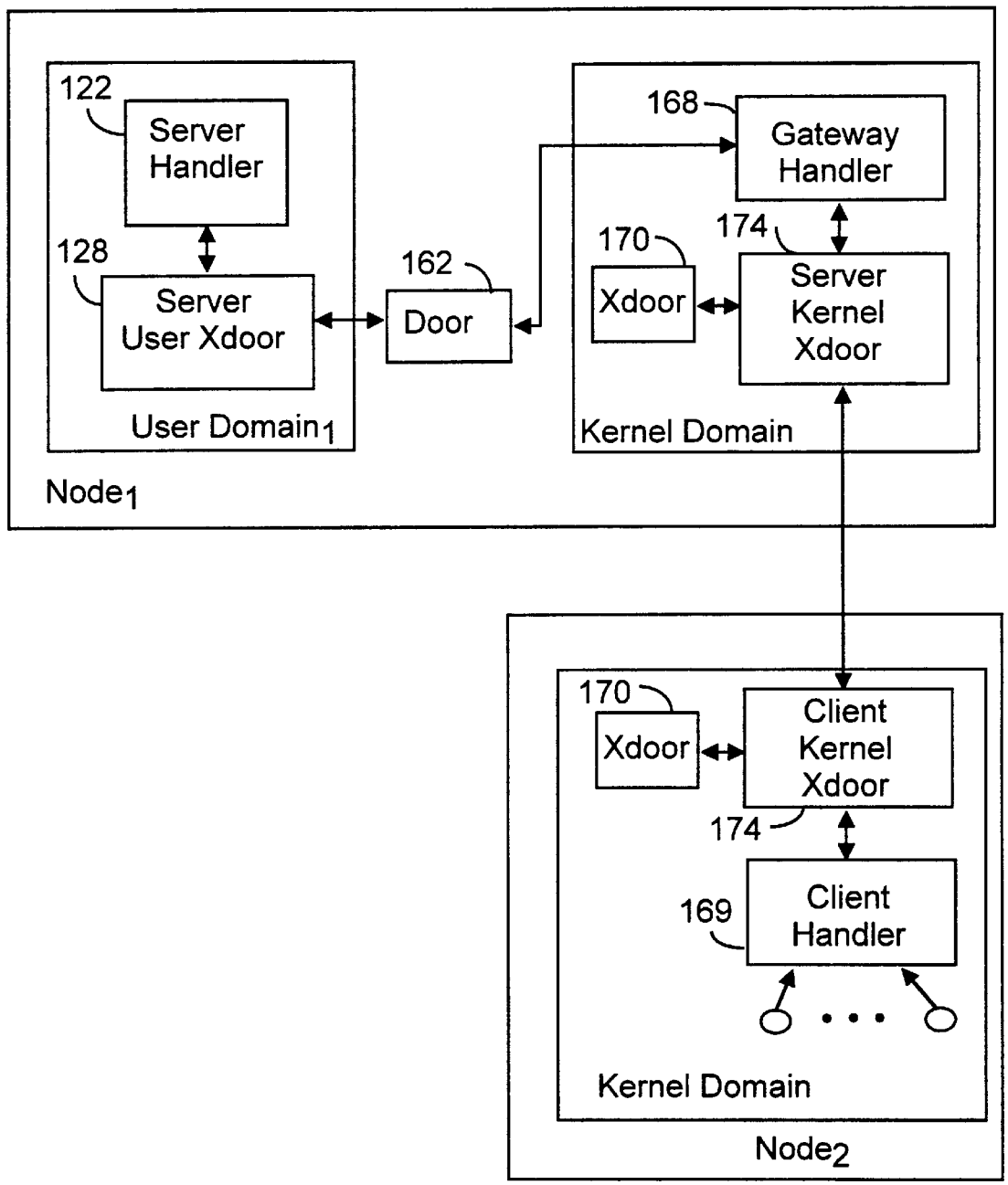

FIG. 4 illustrates the various levels at which an object reference is tracked. The server handler 122 associated with an object tracks references to the object within the object's domain (handler level). The door mechanism that is associated with the inter-process communication facility is used to track references that exist in a different domain within the same node (door level). The xdoor mechanism that is associated with the ORB is used to track references that exist outside the node (xdoor level).

Figure 2:
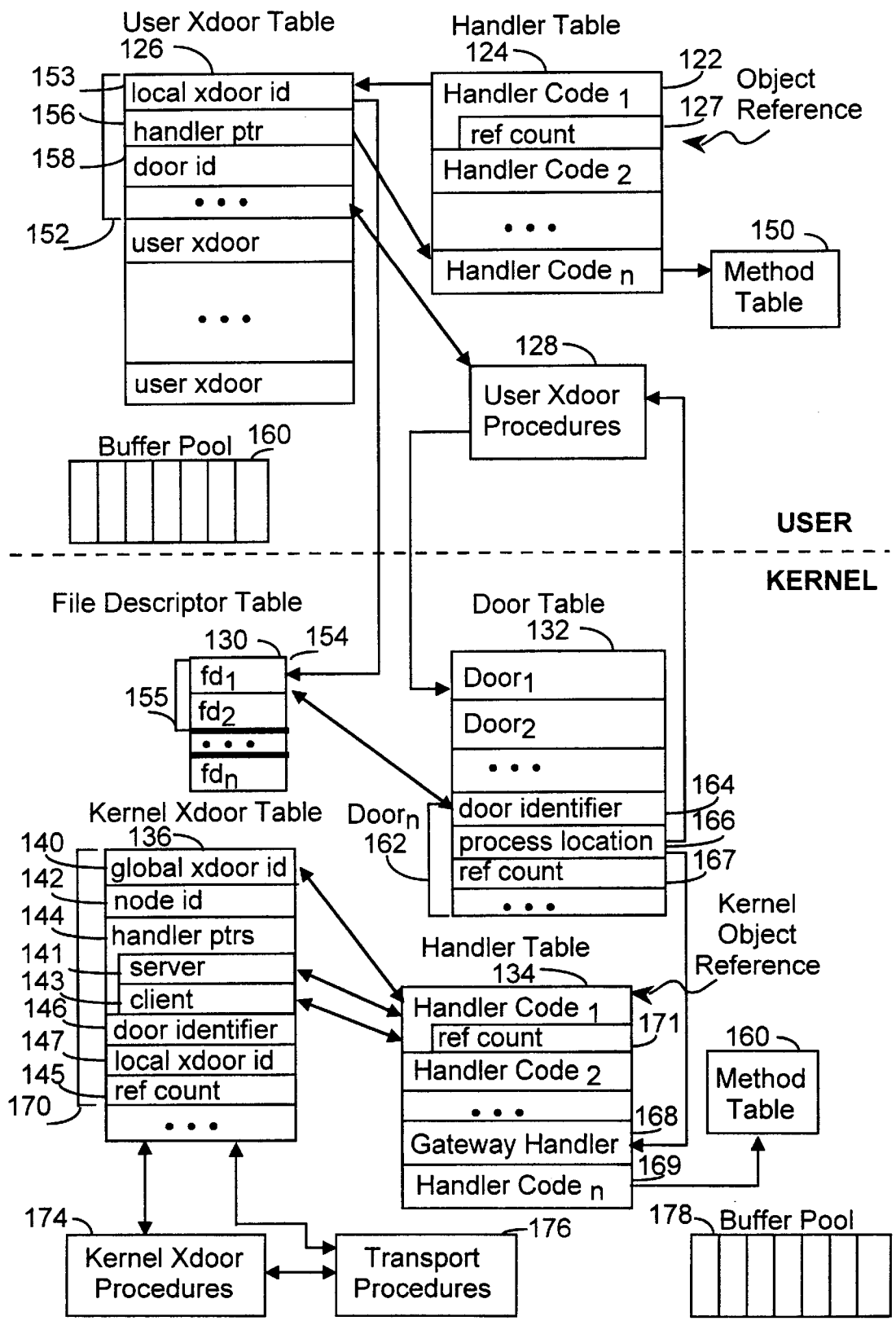
FIG. 2 is a schematic representation of the procedures and data structures used to implement the reference counting mechanism.
Figure 3A:
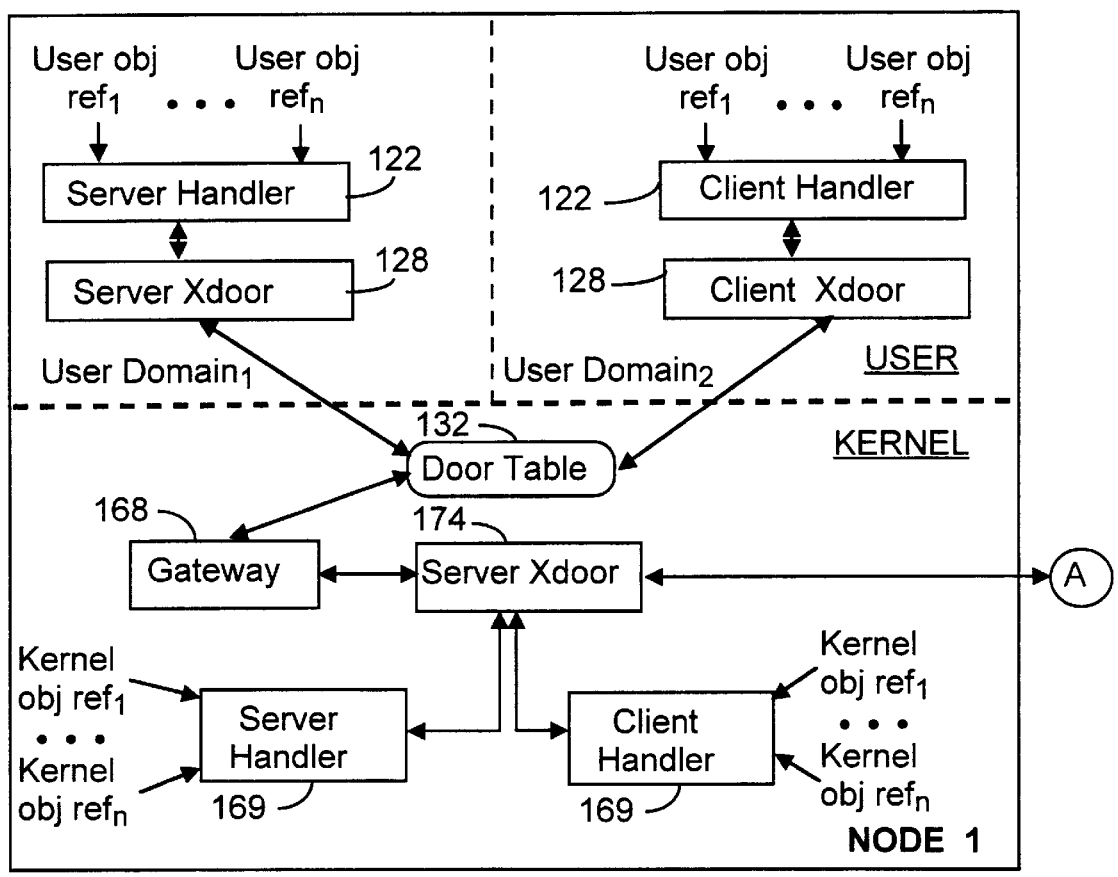
FIGS. 3A–3B are schematic representations of the procedural flow used to track object references.
Figure 3B:
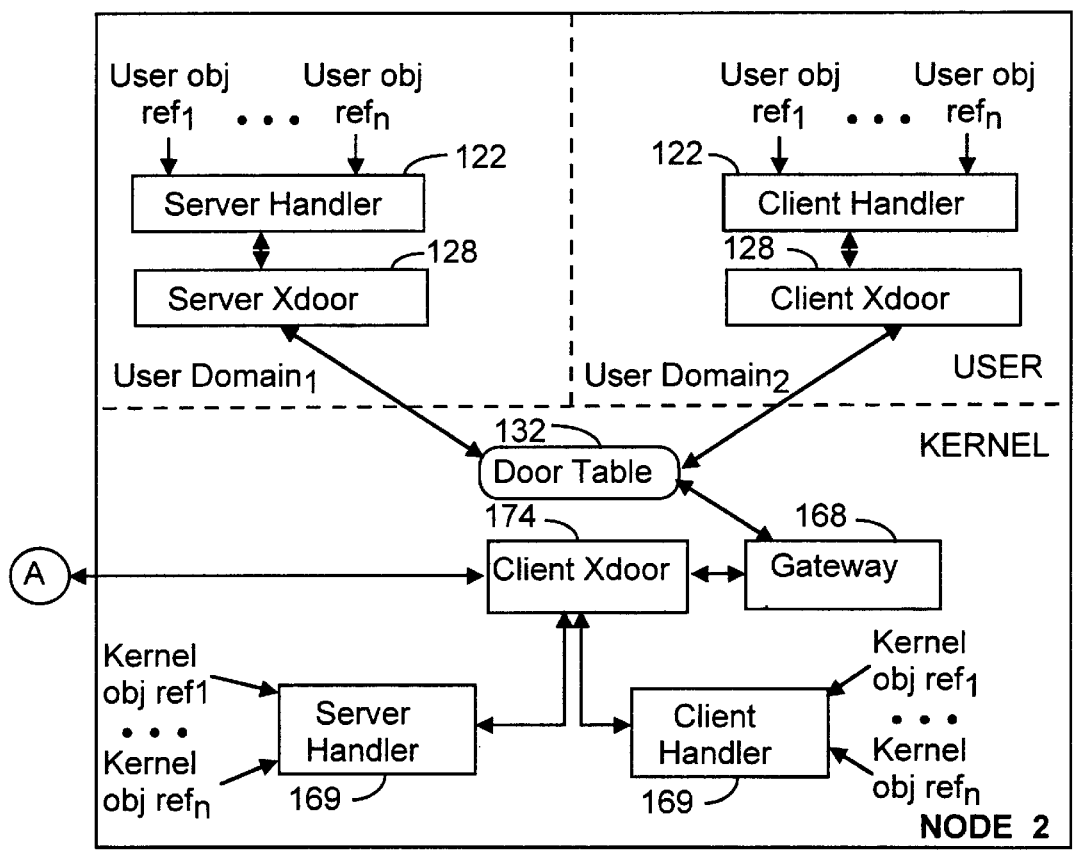

Referring to FIGS. 2 and 3, the server handler 122 associated with an object maintains a reference count 127 of the number of threads within a domain that currently reference the object (handler level). The reference count 127 resides within the server handler procedure 122. For object references that are passed between domains residing in the same node (door level), the door 162 associated with each object maintains a reference count 167 for each user domain within the node that has acquired a reference. In addition, the door's reference count 167 is increased only once when the object is exported outside a server domain (i.e., to the kernel domain or a different domain in a remote node). For object references that are passed between nodes or to the kernel domain (xdoor level), the xdoor 170 associated with each object maintains a reference count 148 for each node that has acquired a reference to the object and for each kernel domain reference.

The reference counting mechanisms at the door and xdoor levels indicate to the server handler associated with an object when their respective references have been relinquished. When the server handler receives both of these messages and has no internal references outstanding, the server handler can relinquish the object and its associated resources.

FIGS. 3–5 illustrate the reference counting mechanism with respect to an user object in more detail. FIG. 5A illustrates the reference counting protocol for tracking object references that are exported between user domains within the same node. FIG. 5B illustrates the reference counting protocol for tracking object references that are exported between a user domain and a kernel domain within the same node. FIG. 5C illustrates the reference counting protocol for tracking object references that are exported between a user domain of one node and a user domain of a second node. FIG. 5D illustrates the reference counting protocol for tracking object references that are exported between a user domain of one node and a kernel domain of a second node. Each of these scenarios will be discussed in detail below.

Referring to FIGS. 2–5A, a server handler 122 maintains a reference count 127 of the number of threads within the object's domain that access a particular object. Each object has an associated server handler 122. The server handler 122 initiates the exportation of an object by transmitting the object reference to the server user xdoor procedure 128. If this is the first time that the object reference is being exported to another domain, the server user xdoor procedure 128 generates a door for the object. The server user xdoor procedure 128 then makes an appropriate remote procedure call (RPC) to pass the object reference to the intended domain.

In the case where the object reference is being passed to another domain in the same node, the RPC is a kernel procedure referred to as a door_call. The door_call is part of the inter-process communication or door mechanism. The door_call increments the reference count 167 of the associated door 162 and transfers control to the associated client user xdoor procedure 128. The door_call utilizes the door's process location field 166 to determine the location of the client user xdoor procedure 128. The door identifier 164 associated with the object reference is passed along to the client user xdoor procedure 128.

The client user xdoor procedure 128 determines whether or not the object reference exists already within the domain. This is done by searching the client domain's user xdoor table 126 for an entry including the received door identifier. If the object reference is found in the user xdoor table 126, the client user xdoor procedure 128 invokes a kernel-level door procedure 177 to close the reference in the domain and to decrement the reference count 167 of the associated door 162.

If the object reference does not already exist in the domain, the client user xdoor procedure 128 generates a file descriptor 154 and client handler 122 for the object reference in the client domain. The file descriptor 154 and client handler 122 enable an intended application to reference the object. In addition, the intended application can export the object reference to other domains. The client handler 122 maintains its own internal reference count 127 indicating the number of references to the object within the client domain.

When all references to the object have been released in the domain, the client handler 122 notifies the client user xdoor procedure 128. The client user xdoor procedure 128 calls the kernel-level door procedure 177 to close the object reference in the domain and to decrement the reference count 167 in the associated door 162.

At some point all object references exported to all remote domains will be relinquished. When this occurs, the reference count 167 associated with an object's door 162 returns to zero. The kernel-level door procedure 177 will notice that the object's door reference count 167 is zero and notify the corresponding server handler 128 that all references to the object in all remote domains have been released. The kernel-level door procedure 177 transmits the message to the server user xdoor procedure 128, which is in turn transmits it to the appropriate server handler 122. When the server handler 122 has received notification that all references to the object have been released, the server handler 122 can initiate the appropriate procedures to release the object.

FIGS. 2–4 and 5B illustrate the reference counting protocol for tracking an user object that is referenced by the kernel domain within the same node. The server handler 122 initiates the exportation of an object by transmitting the object reference to the server user xdoor procedure 128. If this is the first time the object is being passed to the kernel domain, the server user xdoor procedure 128 will generate a gateway handler 168 for the object. The server user xdoor procedure 128 then makes an appropriate remote procedure call (RPC) to pass the object reference to the kernel domain.

In the case where the object reference is being passed to the kernel domain in the same node, the RPC is a kernel procedure referred to as a door_call. The door_call is part of the inter-process communication or door mechanism. The door_call increments the reference count 167 of the associated door 162 and transfers control to the associated gateway handler 168. The door_call utilizes the door's process location field 166 to determine the location of the gateway handler 168. The gateway handler passes the reference to the client kernel xdoor procedure 174.

The client kernel xdoor procedure 174 increments the reference count 145 in the xdoor 170 associated with the object. If this is the first time that the object is being passed to the kernel domain, the client kernel xdoor procedure 174 generates a kernel client handler 169 and xdoor 170 for the object.

If the client kernel xdoor procedure 174 already has an xdoor 170 for the object, the client kernel xdoor procedure 174 transmits a message to the associated gateway handler 168 indicating that the object has been transmitted to the kernel domain previously. The gateway handler 168 then decrements the door's reference count 167. This is done in order to maintain one reference count in the door for any number of references to the kernel domain or another node.

The client kernel xdoor procedure 174 then passes the object reference to the kernel client handler 169. The kernel client handler 169 maintains a reference count 171 of those threads having access to the object within the kernel domain. In addition, the intended application can export the object reference to other domains.

When all references to the object have been released in the kernel domain, the kernel client handler 169 notifies the client kernel xdoor procedure 174. The client kernel xdoor procedure 174 decrements the reference count 145 in the xdoor 170 associated with the object. When the reference count 145 in the xdoor 170 indicates that all external and kernel references have been relinquished, the client kernel xdoor procedure 174 notifies the server handler 122 as will be described in more detail below.

FIGS. 2–4 and 5C illustrate the reference counting protocol for tracking an user object that is referenced by an user domain in a remote node. The server handler 122 initiates the exportation of an object by transmitting the object reference to the server user xdoor procedure 128. If this is the first time the object is being passed outside the client domain, the server user xdoor procedure 128 generates a door 162, file descriptor 154, and gateway handler 168 for the object. The server user xdoor procedure 128 then makes a door_call (RPC) to pass the object reference to the kernel domain.

The door_call increments the reference count 167 of the associated door 162 and transfers control to the associated gateway handler 168. The door_call utilizes the door's process location field 166 to determine the location of the gateway handler 168. The gateway handler 168 passes the object reference to the server xdoor procedure 174.

If this is the first time that the object is being passed to the kernel domain, the server xdoor procedure 174 generates an xdoor 170 for the object.

The server xdoor procedure 174 increments the reference count 145 in the associated xdoor 170 to reflect the exportation of the object reference to another node. The server xdoor procedure 174 then transmits the object reference to the intended node.

The object reference is received by the client kernel xdoor 174 in the intended node. The client kernel door 174 determines whether or not the object reference exists already within the node. This is done by searching the kernel xdoor table 136 for an entry including the received global xdoor identifier 140. If the object reference is found in the kernel xdoor table 136, the client kernel xdoor 174 sends a message to the server kernel xdoor 174 indicating that it has already received the reference. The server kernel xdoor 174 will decrement the reference count 145 in the associated xdoor 170 in the server kernel domain.

If the object reference does not already exist in the domain, the client kernel xdoor procedure 128 generates an xdoor 170 and gateway handler 122 for the object reference.

The client kernel xdoor procedure 174 then transfers control to the gateway handler 168. If the object reference is being passed into the client domain for the first time, the gateway handler 168 generates a door 162 and file descriptor 154 for the object reference. The gateway handler 168 initializes the door's reference count 167 to one in order to account for the client kernel domain's reference to the object. The gateway handler 168 then transfers control to the client user xdoor procedure 128.

If the client user xdoor procedure 128 has already received the object reference, the client user xdoor procedure 128 calls a kernel procedure to decrement the door's reference count 167. The client user xdoor procedure 128 then proceeds to pass the object reference to the intended application.

The client user xdoor procedure 128 generates a client handler 122 for the object reference if this is the first time the object reference is being passed into this client domain. The client handler 122 is used to enable an intended application to reference the object. In addition, the intended application can export the object reference to other domains. The client handler 122 also maintains an internal reference count 127 of those threads accessing the object within the client domain.

When all references to the object within the domain are released, the client handler 122 notifies the client user xdoor 128 of this event. The client user xdoor procedure calls a kernel-level door procedure 177 to decrement the reference count 167 of the associated door 162.

At some point all object references exported to all user domains within the client node will be relinquished. When this occurs, the reference count 167 associated with an object's door 162 returns to one. At this point, the kernel-level door procedure 177 will notify the corresponding gateway handler 168 that all references to the object have been released in all user domains within the node. The gateway handler 168 then notifies the client xdoor procedure 174 of this event.

The client kernel xdoor procedure 174 at some point will realized that all references to the object within the node have been relinquished. This occurs when there are no kernel domain references, as will be explained below, and no user domain references within the node outstanding. When this occurs, the client kernel xdoor procedure 174 then closes the object reference within the node and transmits a message to the server kernel xdoor procedure 174 indicating that the node has no outstanding references to the object. The kernel server xdoor procedure 174 decrements the reference count 148 in the associated xdoor 170.

Turning now to the server kernel xdoor procedure, when the reference count 145 in the xdoor 170 turns to one, the server kernel xdoor procedure realizes that there are no longer any outstanding references to the object from a kernel server domain or any remote nodes. The kernel server xdoor procedure 174 then formats a message indicating this event that is transmitted to the server handler 122. The kernel server xdoor procedure 174 transmits the message to the gateway handler 168. The gateway handler 168 decrements the reference count 167 in the associated door 162, and transmits the message to the associated server handler 122 through the server user xdoor procedure 128.

When the server handler 122 has received notification that all external nodes have relinquished reference to the object, that all domains within the node have relinquished reference to the object, and when the server handler's reference count 127 indicates that there are no longer any local references to the object, the server handler 122 can then take the appropriate action to relinquish the object.

FIGS. 2–4 and 5D illustrate the reference counting protocol for tracking an user object that is referenced by a kernel client domain in a remote node. The server handler 122 initiates the exportation of an object by transmitting the object reference to the server user xdoor procedure 128. If this is the first time the object is being passed outside the client domain, the server user xdoor procedure 128 generates a door 162, file descriptor 154, and gateway handler 168 for the object. The server user xdoor procedure 128 then makes a door_call (RPC) to pass the object reference to the kernel domain.

The door_call increments the reference count 167 of the associated door 162 and transfers control to the associated gateway handler 168. The door_call utilizes the door's process location field 166 to determine the location of the gateway handler 168. The gateway handler 168 passes the object reference to the server xdoor procedure 174.

If this is the first time that the object is being passed to the kernel domain, the server xdoor procedure 174 generates an xdoor 170 for the object.

The server xdoor procedure 174 increments the reference count 145 in the associated xdoor 170 to reflect the exportation of the object reference to another node. The server xdoor procedure 174 then transmits the object reference to the intended node.

The object reference is received by the client kernel xdoor 174 in the intended node. The client kernel door 174 determines whether or not the object reference exists already within the node. This is done by searching the kernel xdoor table 136 for an entry including the received global xdoor identifier 140. If the object reference is found in the kernel xdoor table 136, the client kernel xdoor 174 sends a message to the server kernel xdoor 174 indicating that it has already received the reference. The server kernel xdoor 174 will decrement the reference count 145 in the associated xdoor 170 in the server kernel domain.

If the object reference does not already exist in the domain, the client kernel xdoor procedure 128 generates an xdoor 170 and kernel client handler 169 for the object reference. The client kernel xdoor procedure 174 then transfers control to the client handler 169. The client handler 169 is used to enable an intended application to reference the object. In addition, the intended application can export the object reference to other domains. The client handler 169 also maintains an internal reference count 171 of those threads accessing the object within the client domain.

When all references to the object have been released in the kernel domain, the kernel client handler 169 notifies the client kernel xdoor procedure 174. The client kernel xdoor procedure 174 decrements the reference count 145 in the xdoor 170 associated with the object. When the reference count 145 in the xdoor 170 indicates that all references have been relinquished, the client kernel xdoor procedure 174 notifies the object's server handler as was described previously above.

The reference counting mechanism for tracking user objects has been described. Attention now turns to the reference counting mechanism that is used to track kernel objects.

Kernel-Object Reference Counting

A kernel object can be referenced from various domains. It can be referenced from one or more kernel threads within the domain storing the kernel object's method, from one or more user domains in the same node, or from a different domain in a different node. As such, the reference counting mechanism is distributed throughout the various mechanisms that support the exportation of a kernel object's reference.

FIG. 4 illustrates the various levels at which a kernel object is tracked. The server handler 169 associated with a kernel object tracks references to the kernel object 127 within the kernel object's domain (handler domain). The door mechanism that is associated with the inter-process communication facility is used to track references that exist in user domains (door level). The xdoor mechanism that is associated with the ORB is used to track references that exist outside the server domain (xdoor level).

Figure 6A:
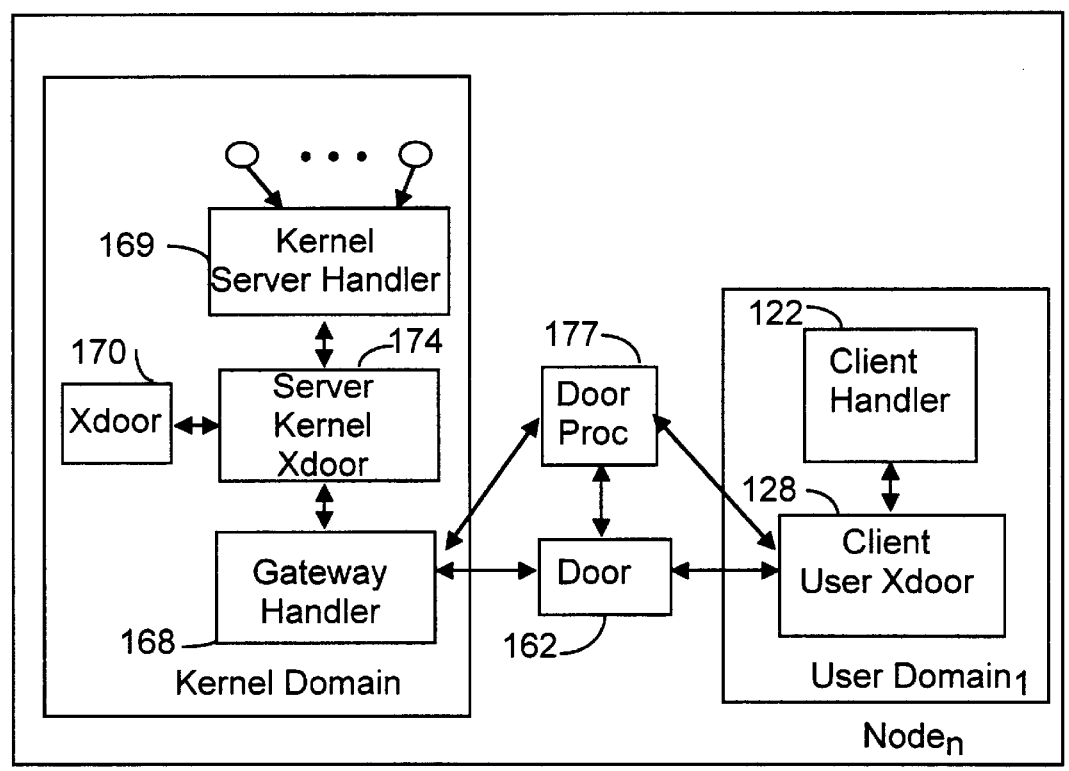
FIGS. 6A–6C are flow charts illustrating the steps used to track a kernel object.
Figure 6B:
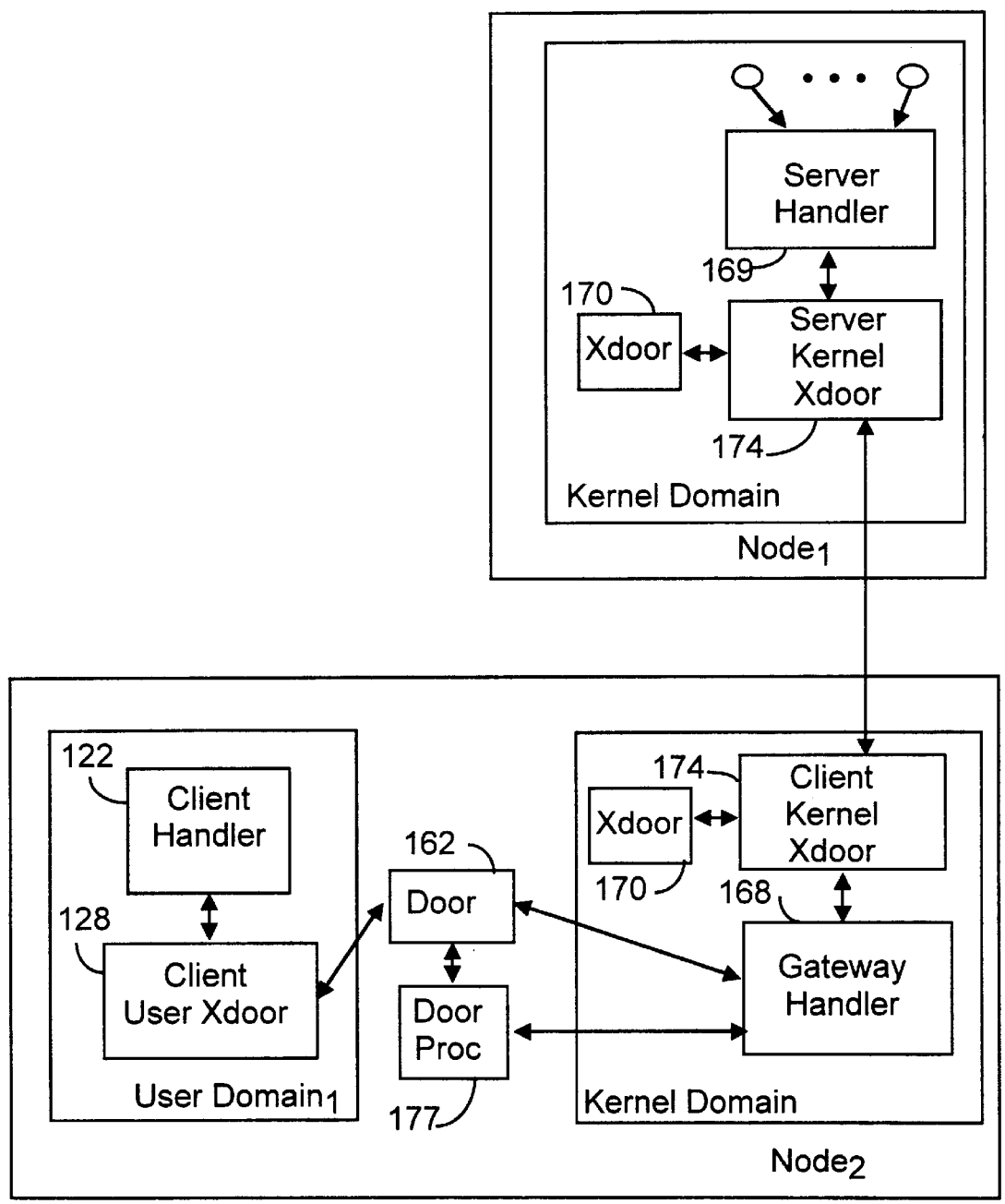
Figure 6C:
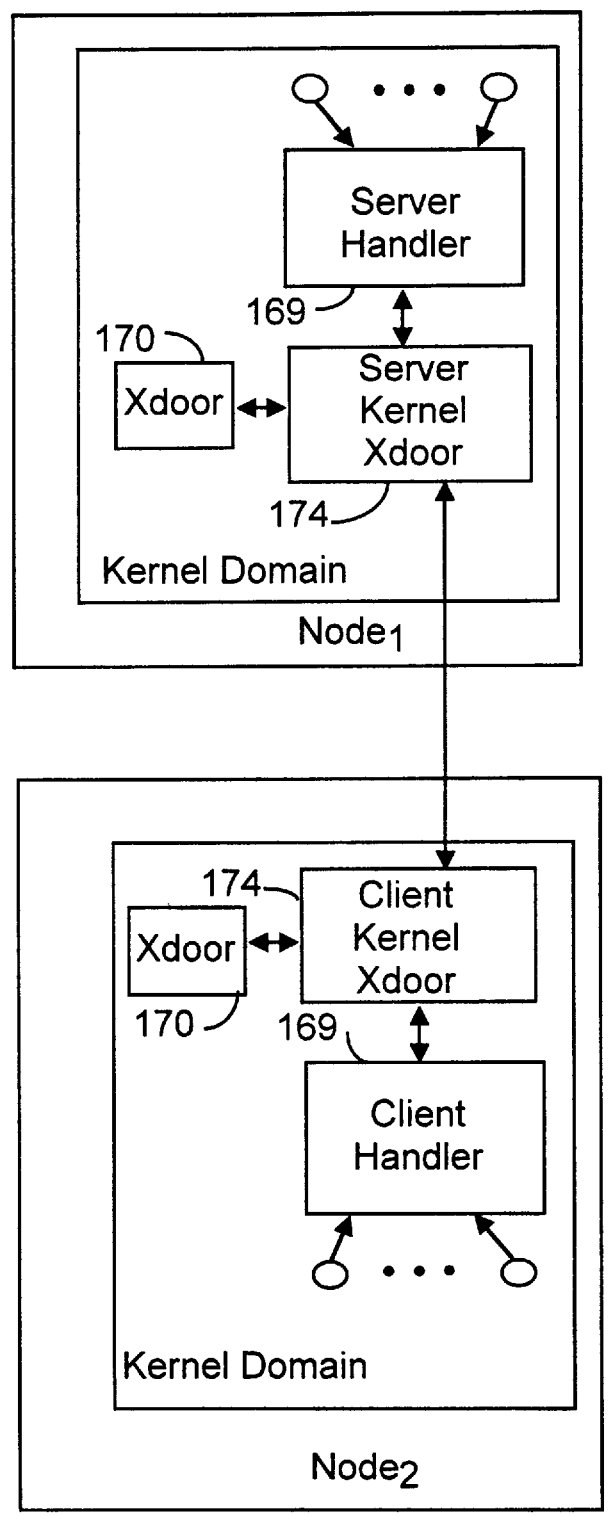

FIGS. 3–4, and 6 illustrate the reference counting mechanism with respect to a kernel object in more detail. FIG. 6A illustrates the reference counting protocol for tracking kernel object references that are exported to user domains within the same node. FIG. 6B illustrates the reference counting protocol for tracking kernel object references that are exported between a kernel domain of a server node and a user domain of a client node. FIG. 6C illustrates the reference counting protocol for tracking kernel object references that are exported between a kernel domain of a server node and kernel domain of a client node. Each of these scenarios will be discussed in detail below.

FIGS. 2–4 and 6A illustrate the reference counting protocol for tracking a kernel object that is referenced by one or more user domains within the same node as the kernel object. The server handler 169 associated with a kernel object maintains a reference count 171 of the number of threads within a kernel domain that currently reference the kernel object. Each kernel object has an associated server handler 169. The server handler 169 initiates the exportation of a kernel object by transmitting the kernel object reference to the server kernel xdoor procedure 174.

The server kernel xdoor procedure 174 will generate an xdoor 170 and gateway handler 168 for the kernel object the first time the kernel object is exported to a different domain. The server kernel xdoor procedure 174 transmits the object reference to the gateway handler 168. The gateway handler 168 generates a door and file descriptor 154 for the kernel object the first time the kernel object is exported to a user domain within the node.

The gateway handler 168 performs a door_upcall to transfer the object reference to an intended user domain. The door_upcall increments the reference count 167 in the door 162 and transfers control to the client user xdoor procedure 128.

The client user xdoor procedure 128 will generate a client handler for the object reference in the client domain if this is the initial time the kernel object is being passed to the client domain.

The client user xdoor procedure 128 also checks if the kernel object reference has been previously transmitted to the client domain. In this case, the client user xdoor procedure 128 calls a kernel-level door procedure 177 to decrement the reference count 167 of the associated door 162.

The client user xdoor procedure 128 then transfers control to the client handler 122. The client handler 122 is used to enable an intended application to reference the object. In addition, the intended application can export the object reference to other domains. The client handler 122 also maintains an internal reference count 127 of those threads accessing the object within the client domain.

When all references to the object within the domain are released, the client handler 122 notifies the client user xdoor procedure 128 of this event. The client user xdoor procedure 128 calls a kernel-level door procedure 177 to decrement the reference count 167 of the associated door 162.

At some point all object references exported to all user domains within the server node will be relinquished. When this occurs, the reference count 167 associated with an object's door 162 returns to one. At this point, the kernel-level door procedure 177 will notify the corresponding gateway handler 168 that all references to the object have been released in all user domains within the node. The gateway handler 168 then notifies the server kernel xdoor procedure 174 of this event. Under certain conditions, as will be described below, the server kernel xdoor procedure 174 will notify the server handler that all remote references to the kernel object have been relinquished.

FIGS. 2–4 and 6B illustrate the reference counting protocol for tracking a kernel object that is referenced by one or more user domains within a remote node. The server handler 169 initiates the exportation of a kernel object by transmitting the kernel object reference to the server kernel xdoor procedure 174. The server kernel xdoor procedure 174 will generate an xdoor 170 for the kernel object if this is the first time the kernel object is exported to a remote domain. The server kernel xdoor procedure 174 then transmits the kernel object reference to the intended node.

The object reference is received by the client kernel xdoor 174 in the intended node. The client kernel door 174 determines whether or not the object reference exists already within the node. This is done by searching the kernel xdoor table 136 for an entry including the received global xdoor identifier 140. If the object reference is found in the kernel xdoor table 136, the client kernel xdoor 174 sends a message to the server kernel xdoor 174 indicating that it has already received the reference. The server kernel xdoor 174 will decrement the reference count 145 in the associated xdoor 170 in the server kernel domain.

If the object reference does not already exist in the domain, the client kernel xdoor procedure 128 generates an xdoor 170 and gateway handler 122 for the object reference.

The client kernel xdoor procedure 174 then transfers control to the gateway handler 168. If the object reference is being passed into the client domain for the first time, the gateway handler 168 generates a door 162 and file descriptor 154 for the object reference. The gateway handler 168 initializes the door's reference count 167 to one in order to account for the kernel domain's reference to the object. The gateway handler 168 then transfers control to the client user xdoor procedure 128.

If the client user xdoor procedure 128 has already received the object reference, the client user xdoor procedure 128 calls a kernel procedure to decrement the door's reference count 167. The client user xdoor procedure 128 then proceeds to pass the object reference to the intended application.

The client user xdoor procedure 128 generates a client handler 122 for the object reference if this is the first time the object reference is being passed into this client domain. The client handler 122 is used to enable an intended application to reference the object. In addition, the intended application can export the object reference to other domains. The client handler 122 also maintains an internal reference count 127 of those threads accessing the object within the client domain.

When all references to the object within the domain are released, the client handler 122 notifies the client user xdoor 128 of this event. The client user xdoor procedure 128 calls a kernel-level door procedure 177 to decrement the reference count 167 of the associated door 162.

At some point all object references exported to all user domains within the client node will be relinquished. When this occurs, the reference count 167 associated with an object's door 162 returns to one. At this point, the kernel-level door procedure 177 will notify the corresponding gateway handler 168 that all references to the object have been released in all user domains within the node. The gateway handler 168 then notifies the client kernel xdoor procedure 174 of this event.

The client kernel xdoor procedure 174 at some point will realize that all references to the object within the node have been relinquished. This occurs when there are no kernel domain references outstanding and when there are no user domain references within the node outstanding. When this occurs, the client kernel xdoor procedure 174 then closes the object reference within the node and transmits a message to the server kernel xdoor procedure 174 indicating that the nodes has no outstanding references to the object. The kernel server xdoor procedure 174 decrements the reference count 145 in the associated xdoor 170.

Turning now to the server kernel xdoor procedure 174, when the reference count 145 in the xdoor 170 turns to one, the server kernel xdoor procedure 174 realizes that there are no longer any outstanding references to the object from a kernel domain or any remote nodes. The kernel server xdoor procedure 174 then formats a message indicating this event that is transmitted to the server handler 122. The kernel server xdoor procedure 174 transmits the message to the gateway handler 168. The gateway handler 168 decrements the reference count 167 in the associated door 162, and transmits the message to the associated server handler 122 through the server user xdoor procedure 128.

When the server handler 122 has received notification that all external nodes have relinquished reference to the object, that all domains within the node have relinquished reference to the object, and when the server handler's reference count 127 indicates that there are no longer any local references to the object, the server handler 122 can then take the appropriate action to relinquish the object.

FIGS. 2–4 and 6C illustrate the reference counting protocol for tracking a kernel object that is referenced by a kernel domain within a remote node. The server handler 169 initiates the exportation of a kernel object by transmitting the kernel object reference to the server kernel xdoor procedure 174. The server kernel xdoor procedure 174 will generate an xdoor 170 for the kernel object if this is the first time the kernel object is exported to a remote domain. The reference count 145 of the xdoor 170 is incremented. The server kernel xdoor procedure 174 then transmits the kernel object reference to the intended node.

The object reference is received by the client kernel xdoor 174 in the intended node. The client kernel door 174 determines whether or not the object reference exists already within the node. This is done by searching the kernel xdoor table 136 for an entry including the received global xdoor identifier. If the object reference is found in the kernel xdoor table 136, the client kernel xdoor 174 sends a message to the server kernel xdoor 174 indicating that it has already received the reference. The server kernel xdoor 174 will decrement the reference count 145 in the associated xdoor in the server kernel domain.

If the object reference does not already exist in the domain, the client kernel xdoor procedure 174 generates an xdoor 170 and kernel client handler 169 for the object reference. The client kernel xdoor procedure 174 then transfers control to the client handler 169. The client handler 169 is used to enable an intended application to reference the object. In addition, the intended application can export the object reference to other domains. The client handler 169 also maintains an internal reference count 171 of those threads accessing the object within the client domain.

When all references to the object have been released in the kernel domain, the kernel client handler 169 notifies the client kernel xdoor procedure 174. The client kernel xdoor procedure 174 decrements the reference count 145 in the xdoor 170 associated with the object. When the reference count 145 in the xdoor 170 indicates that all external and kernel references have been relinquished, the client kernel xdoor procedure 174 notifies the server handler as described previously above.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

The present invention is not limited to the computer system described in reference to FIG. 1. It may be practiced without the specific details and may be implemented in various configurations, or makes or models of distributed computing systems, tightly-coupled processors or in various configurations of loosely-coupled microprocessor systems.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

What is claimed is:

1. A computer system, comprising:

a plurality of domains, each said domain having a separate address space;

a plurality of objects, each said object associated with a select one of said domains, each said object associated with a first reference count mechanism for tracking references to a specific object within said specific object's domain;

an inter-domain communication facility for handling communications between each said domain, said inter-domain communication facility including a second reference count mechanism for tracking references to a particular one of said objects within one or more different domains;

an communication link for connecting said computer system with one or more remote computing nodes; and an extended communication facility for handling communications between said computer system and said remote computing nodes, said extended communication facility including a third reference count mechanism for tracking references to a certain object by said remote computing nodes.

2. The system of claim 1, a plurality of server handlers, each said server handler associated with a select one of said objects, each said server handler used to invoke said select object;

each said server handler including said first reference counting mechanism; and said first reference counting mechanism including a first reference count having one count for each reference in said associated domain.

3. The system of claim 2, said domains including one or more user domains and at least one kernel domain, said user domains associated with user applications, said kernel domain associated with an operating system;

said second reference count mechanism including a second reference count having one count for each user domain in said computer system having a reference to said particular object, only one count for all references to said particular object by each remote node, and only one count for all references to said particular object by a kernel domain in said computer system.

4. The system of claim 3,
said third reference count mechanism including a third reference count having one count for each reference to said certain object by a select one of said nodes and one count for all references to said certain object by a kernel domain within said computer system.

5. The system of claim 4,
said third reference count mechanism includes instructions to notify said certain object's server handler when said third reference count indicates that no outstanding references to said certain object exists.

6. The system of claim 5,
said second reference count mechanism includes instructions to notify said particular object's server handler when said second reference count indicates that no outstanding references to said particular object exists.

7. The system of claim 6,
each said server handler including instructions to initiate an object resource reclamation mechanism when said server handler receives notification from said second and third references counting mechanisms and said associated first reference count indicates no outstanding references within said associated domain exist.

8. A computer readable storage medium for storing data for access by programs being executed on a data processing system including a plurality of nodes, said medium comprising:
a plurality of domains, each said domain having a separate address space;
a plurality of objects, each said object associated with a select one of said domains, each said object associated with a first reference count mechanism for tracking references to a specific object within said specific object's domain;
an inter-domain communication facility for handling communications between each said domain, said inter-domain communication facility including a second reference count mechanism for tracking references to a particular one of said objects within one or more different domains;
an communication link for connecting said computer system with one or more remote computing nodes; and
an extended communication facility for handling communications between said computer system and said remote computing nodes, said extended communication facility including a third reference count mechanism for tracking references to a certain object by said remote computing nodes.

9. The medium of claim 8,
a plurality of server handlers, each said server handler associated with a select one of said objects, each said server handler used to invoke said select object;
each said server handler including said first reference counting mechanism; and
said first reference counting mechanism including a first reference count having one count for each reference in said associated domain.

10. The medium of claim 9,
said domains including one or more user domains and at least one kernel domain, said user domains associated with user applications, said kernel domain associated with an operating system;
said second reference count mechanism including a second reference count having one count for each user domain in said computer system having a reference to said particular object, only one count for all references to said particular object by a remote node, and only one count for all references to said particular object by a kernel domain in said computer system.

11. The medium of claim 10,
said third reference count mechanism including a third reference count having one count for all references to said certain object by a select one of said nodes and one count for all references to said certain object by a kernel domain within said computer system.

12. The medium of claim 11,
said third reference count mechanism includes instructions to notify said certain object's server handler when said third reference count indicates that no outstanding references to said certain object exists.

13. The medium of claim 12,
said second reference count mechanism includes instructions to notify said particular object's server handler when said second reference count indicates that no outstanding references to said particular object exists.

14. The medium of claim 13,
each said server handler including instructions to initiate an object resource reclamation mechanism when said server handler receives notification from said second and third references counting mechanisms and said associated first reference count indicates no outstanding references within said associated domain exist.

15. A method for tracking references to an object in a computer system including a plurality of nodes, said method comprising the steps of:
providing a plurality of domains in each said node, each said domain having a separate address space, each domain including a plurality of objects and object references, each said object reference associated with a select one of said objects in a server domain in a server node;
supplying a first reference counting mechanism for each said object in said server domain, said first reference counting mechanism tracking object references to a select one of said objects within said object's server domain;
furnishing a second reference counting mechanism for each said object in said server node to track object references to a particular object by one or more domains in said particular object's server node;
providing a third reference counting mechanism for each said object in said server node to track object references to a certain one of said objects by one or more of said nodes; and
enabling deletion of each of said objects when said deleted object's corresponding first, second and third reference counting mechanisms indicate that no outstanding references exist to said deleted object.

16. The method of claim 15,
incrementing said first reference counting mechanism associated with a select object once for each object reference to said select object within said select object's server domain;
incrementing said second reference counting mechanism associated with a particular object once for each distinct domain in said server node referencing said particular object; and
incrementing said third reference counting mechanism associated with a certain object once for each distinct node referencing said certain object.

17. The method of claim 16, decrementing said first reference counting mechanism associated with a select one of said objects when each object reference to said select object in said server domain is released;

decrementing said second reference counting mechanism associated with a particular one of said objects when each object reference to said particular object by a distinct domain is released; and decrementing said third reference counting mechanism associated with a certain one of said objects when each object reference to said certain object by a distinct node is released.

18. The method of claim 17, providing a fourth reference counting mechanism for each said object in each client node referencing said object, said fourth reference counting mechanism tracking object references to said object in a client node;

supplying a fifth reference counting mechanism for each said object in each client node referencing said object, said fifth reference counting mechanism tracking references to said object by each domain within said client node; and furnishing a sixth reference counting mechanism for each said object in each client node referencing said object, said sixth reference counting mechanism tracking references to said object within each said domain within said client node.

19. The method of claim 18, incrementing said fifth reference counting mechanism once for each object reference by a distinct domain within a client node; and incrementing said sixth reference counting mechanism once for each object reference to a particular object within a particular domain within a client node.

20. The method of claim 19, decrementing said fourth reference counting mechanism associated with a select one of said objects when each object reference to said select object in a client node is released;

decrementing said fifth reference counting mechanism associated with a particular one of said objects when each object reference to said particular object by a distinct domain in a client node is released; and decrementing said sixth reference counting mechanism associated with a certain one of said objects when each object reference to said certain object within a client domain in said client node is released.

21. The method of claim 20, notifying said third reference counting mechanism in said server node that all object references to a certain one of said objects is released when said fourth reference counting mechanism indicates no outstanding object references to said certain object by a particular client node.

* * * * *